United States Patent
Cowan et al.

(10) Patent No.: US 7,670,004 B2
(45) Date of Patent: Mar. 2, 2010

(54) DUAL ZSCREEN® PROJECTION (75) Inventors: Matt Cowan, Bloomingdale (CA); Josh Greer, Beverly Hills, CA (US); Lenny Lipton, Los Angeles, CA (US)

(73) Assignee: Real D, Beverly Hills, CA (US)

( * ) Notice: Subject to any disclaimer, the term of this patent is extended or adjusted under 35 U.S.C. 154(b) by 593 days.

(21) Appl. No.: 11/583,245

(22) Filed: Oct. 18, 2006

(65) Prior Publication Data
US 2008/0143964 A1  Jun. 19, 2008

(51) Int. Cl.
G03B 35/20 (2006.01)
G02B 27/22 (2006.01)

(52) U.S. Cl. .................. 353/8; 353/94; 352/60; 352/62; 348/57; 348/58; 349/15; 359/464; 359/465

(58) Field of Classification Search ............ 353/7, 353/8, 20, 94; 348/42, 51, 52, 57, 58; 359/464, 359/465; 349/15; 352/60, 62, 63
See application file for complete search history.

(56) References Cited

U.S. PATENT DOCUMENTS

| | | | |
|---|---|---|---|
| 4,792,850 A | 12/1988 | Lipton et al. | |
| 4,954,890 A * | 9/1990 | Park | 348/58 |
| 5,239,372 A * | 8/1993 | Lipton | 348/58 |
| 5,392,140 A | 2/1995 | Ezra et al. | |
| 5,855,425 A * | 1/1999 | Hamagishi | 353/7 |
| 6,160,574 A * | 12/2000 | Oba et al. | 348/46 |
| 6,988,803 B2 * | 1/2006 | Maximus | 353/20 |
| 7,187,420 B2 * | 3/2007 | Yamazaki et al. | 348/752 |
| 7,236,175 B2 * | 6/2007 | Li et al. | 345/473 |
| 7,477,206 B2 * | 1/2009 | Cowan et al. | 345/6 |
| 2001/0028416 A1 * | 10/2001 | Divelbiss et al. | 349/43 |
| 2003/0103178 A1 * | 6/2003 | Sakamoto et al. | 349/113 |
| 2005/0046700 A1 | 3/2005 | Bracke | |
| 2005/0219357 A1 | 10/2005 | Sun et al. | |
| 2007/0002132 A1 * | 1/2007 | Kim et al. | 348/57 |
| 2007/0127121 A1 * | 6/2007 | Maximus et al. | 359/465 |
| 2008/0143965 A1 * | 6/2008 | Cowan et al. | 353/8 |

OTHER PUBLICATIONS

International Preliminary Report on Patentability for PCT/US07/21781 mailed May 7, 2009.

* cited by examiner

*Primary Examiner*—William C Dowling
(74) *Attorney, Agent, or Firm*—Baker & McKenzie LLP (57) ABSTRACT A system and method for projecting stereoscopic images using a multiple projector arrangement is provided. The design comprises transmitting a first field train from the first projector, the first field train comprising first projector left and right images and concurrently transmitting a second field train from the second projector, the second field train comprising second projector left and right images. The first projector left image is transmitted by the first projector at substantially a same time as the second projector right image is transmitted by the second projector. Alternately, the design comprises transmitting a first field train from the first projector, the first field train comprising first projector left images alternating with first projector right images, and concurrently transmitting a second field train from the second projector, the second field train comprising second projector left images alternating with second projector right images. A quasi-interlacing technique is also provided.

21 Claims, 8 Drawing Sheets

DUAL ZSCREEN® PROJECTION

BACKGROUND OF THE INVENTION

1. Field of the Invention

The present invention relates to the art of stereoscopic motion picture display, and more specifically to coordinating two projectors for stereoscopic motion picture projection wherein illumination and temporal binocular symmetrical constraints are met.

2. Description of the Related Art

Stereoscopic displays in general—and stereoscopic motion picture systems in particular—must adhere to an important design constraint called binocular symmetries, first articulated by Lipton, in *Foundations of the Stereoscopic Cinema*, Van Nostrand Reinhold, New York, 1982. Binocular symmetries are an optical symmetrical or congruence principle, in which the left and right image fields must be carefully matched to within specifiable tolerances in order to insure that the stereoscopic image provides a pleasing image.

If this symmetrical constraint is not met, the result for the observer is what people sometimes call "eyestrain," which describes the unpleasant sensation arising when viewing stereoscopic images. Some people will report the unpleasant sensation, as mentioned, as eyestrain; others will call it fatigue or a headache. Whatever it is called, since such asymmetries do not occur in the visual world, there is no generally accepted nomenclature to describe the resultant sensations. Therefore, people refer to the discomfort encountered by whatever name they find to be convenient or possible to the part of the body to which the discomfort is referred. The binocular symmetries are classified into three major categories: illumination, temporal, and geometrical.

Stereoscopic moving images are transmitted using projection systems, including but not limited to the ZScreen® design available from StereoGraphics Corporation. When binocular symmetries (illumination, temporal, and/or geometrical) occur using the ZScreen or any type of digital projection system, the aforementioned discomfort to the viewer can result.

It is beneficial to provide a system addressing and overcoming the binocular symmetry problems present in previously known projection designs, and to provide a stereoscopic projection arrangement or design having improved functionality over devices exhibiting those negative aspects described herein.

SUMMARY OF THE INVENTION

According to a first aspect of the present design, there is provided a method for projecting stereoscopic images using a multiple projector arrangement comprising a first projector and a second projector. The method comprises transmitting a first field train from the first projector, the first field train comprising first projector left and right images, and concurrently transmitting a second field train from the second projector, the second field train comprising second projector left and right images. The first projector left image is transmitted by the first projector at substantially a same time as the second projector right image is transmitted by the second projector.

According to a second aspect of the present design, there is provided a method for projecting stereoscopic images using a multiple projector arrangement comprising a first projector and a second projector. The method comprises transmitting a first field train from the first projector, the first field train comprising first projector left images alternating with first projector right images, and concurrently transmitting a second field train from the second projector, the second field train comprising second projector left images alternating with second projector right images. The first projector transmits one first projector left image at a first time substantially identical to the second projector transmitting one second projector left image.

According to either of the foregoing aspects, quasi-interlacing may be employed with the aspects described.

These and other objects and advantages of the present invention will become apparent to those skilled in the art from the following detailed description of the invention and the accompanying drawings.

DETAILED DESCRIPTION OF THE INVENTION

The present design seeks to address binocular symmetries present in stereoscopic motion picture projection systems. As noted above, binocular asymmetries will create discomfort to viewers and results from the left and right images that do not conform to well articulated design principles that are reviewed below and also described in more detail in Lipton as referenced above.

Binocular symmetries are classified into three major categories: illumination, temporal, and geometrical.

Illumination asymmetries include the following subcategories: overall illumination intensity, asymmetrical intensity or vignetting, and color balance. For the case of overall illumination intensity, if one image is brighter than the other, the observer will feel an unpleasant sensation. The level of discomfort depends on how much brighter one image is than the other, but it doesn't take very much of a difference to create an unpleasant sensation. A 20% difference in illumination intensity between the two images will result in the sensation that one eye is "pulling", or result in eyestrain, or headaches, or other unpleasant feelings.

Another illumination asymmetry can be described as vignetting. Typically, in photography "vignetting" refers to the effect of corner darkening. Since lenses, by a cosine law, don't have even illumination, vignetting typically will occur in the corners of the frame. If the vignetting is symmetrical—in other words, if vignetting is identical in the left and right fields—the result is no discomfort because there is a symmetrical condition. But if the vignetting is asymmetrical, darkening in, for example, the right image's right corner but not in the left image's right corner, this results in another serious cause of a unpleasant sensations.

The last illumination asymmetry has to do with color balance. The tolerances can be less stringent because of the phenomenon of binocular color mixing but it remains a cause of unpleasant sensations. If the color temperature or color balance of the left and the right field don't match to within a specifiable tolerance, this is yet another source of concern.

Discomfort or "eyestrain" encountered as a result of these asymmetries is additive with time and cumulative as the artifacts pile up. That is to say, the longer one experiences an asymmetrical stereoscopic image from any cause whatsoever, the worse the feeling of discomfort. Also, although there are about a half a dozen definable symmetries, departures from the condition are additive notwithstanding the fact that they may fall into different categories. For example, if the stereoscopic moving image includes both illumination and geometry asymmetries simultaneously, these make the experience of viewing the film cumulatively and increasingly unpleasant.

Regarding temporal asymmetry, if the left and right images are not captured and presented essentially simultaneously, there may result in the generation of spurious temporal parallax that is perceived as a peculiar difficult to articulate "rippling" associated with motion or sometimes perceived as a kind of object flicker or "stereo-judder." The left and right images have to be captured or photographed in the real world (and this is also true for the computer generated image field) essentially simultaneously. If not, the motion of objects turns into unwanted spatial parallax. This transformation of motion captured because shutters are out of phase or synchronization results in spurious temporal parallax. One primary concern of the present design is with projection and similar perceived asymmetries are so noted, and therefore the projection of the image fields or frames is desired to be essentially simultaneous. This condition is mitigated, for single projector projection using a ZScreen, for example, if the repetition rate is at a high enough frequency.

With regard to the temporal symmetrical condition more needs to be said: Generally speaking, two kinds of stereoscopic projection systems exist: those that project the left and right images simultaneously, and those that project the left and right image in sequence (right, left, right, left, and so on). If the left and right images are not projected at a high enough field rate when projected in sequence, the result is the aforementioned judder. The images are at a high enough field rate to satisfy what is known as the critical fusion frequency constraint. However, for stereoscopic projection an additional constraint exists having to do with the suppression of the temporal motion artifacts and the perception of stereoscopic judder. The image has to be repeated at a high enough rate in field sequential projection such that simultaneity is in a certain sense approximated. For material shot at 60 fields per second per eye, as is the usual case for television in the United States, a repetition rate of 120 fields per second—in other words, 60 lefts and 60 rights is satisfactory. At a high enough repetition rate the judder artifact does not occur. In theaters today, for material shot at 24 frames per second, each frame is typically concatenated and repeated three times for a total repetition rate of 144 frames per second to preclude the rippling or judder artifacts, double repetition or 96 frames per second having proven to be inadequate.

The geometric binocular symmetrical constraints are also noteworthy. If the magnification of one of the images is different from the other or out of definable tolerance, the result is a misalignment of homologous points with resultant eyestrain. Vertical asymmetry, with one image shifted upward with respect to the other, is also a serious problem because, generally speaking, when viewing the visual field the eyes fuse images based on vergence in the horizontal direction. When looking at a stereoscopic image, if the eyes are called upon to fuse in the vertical direction (within certain specifiable limits) the result is an unpleasant sensation or even pain.

In terms of psychophysics, some of the asymmetries produce unpleasant sensations due to unusual muscular effort, like vergence, and some of the asymmetries, like the illumination category, have a neurological basis having to do with the optical pathway in terms of a perception of unbalanced images. The present design addresses these artifacts and unpleasant sensations generated by the illumination and temporal asymmetries.

Figure 1A:
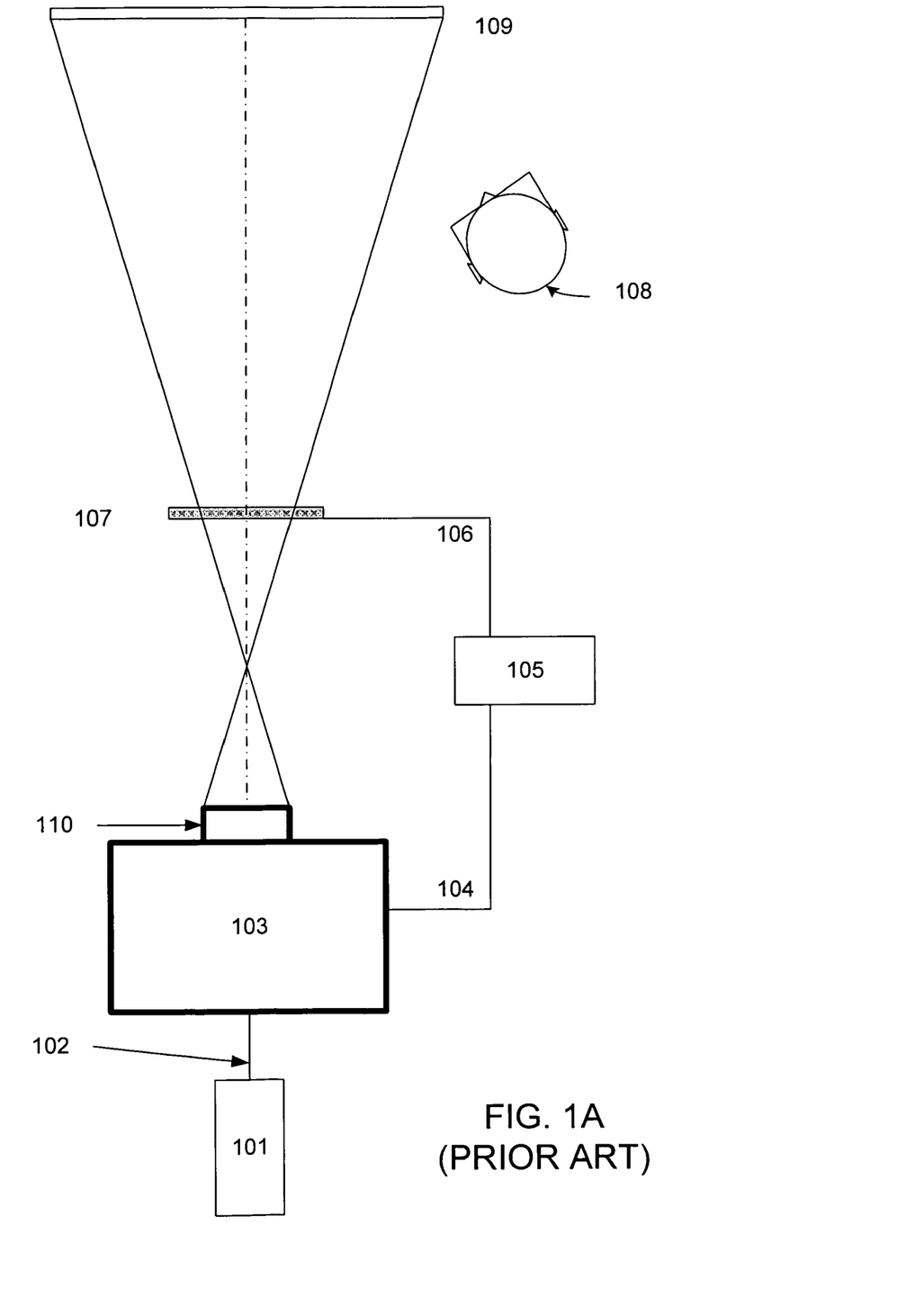
FIG. 1A represents field sequential projection.
Figure 1B:
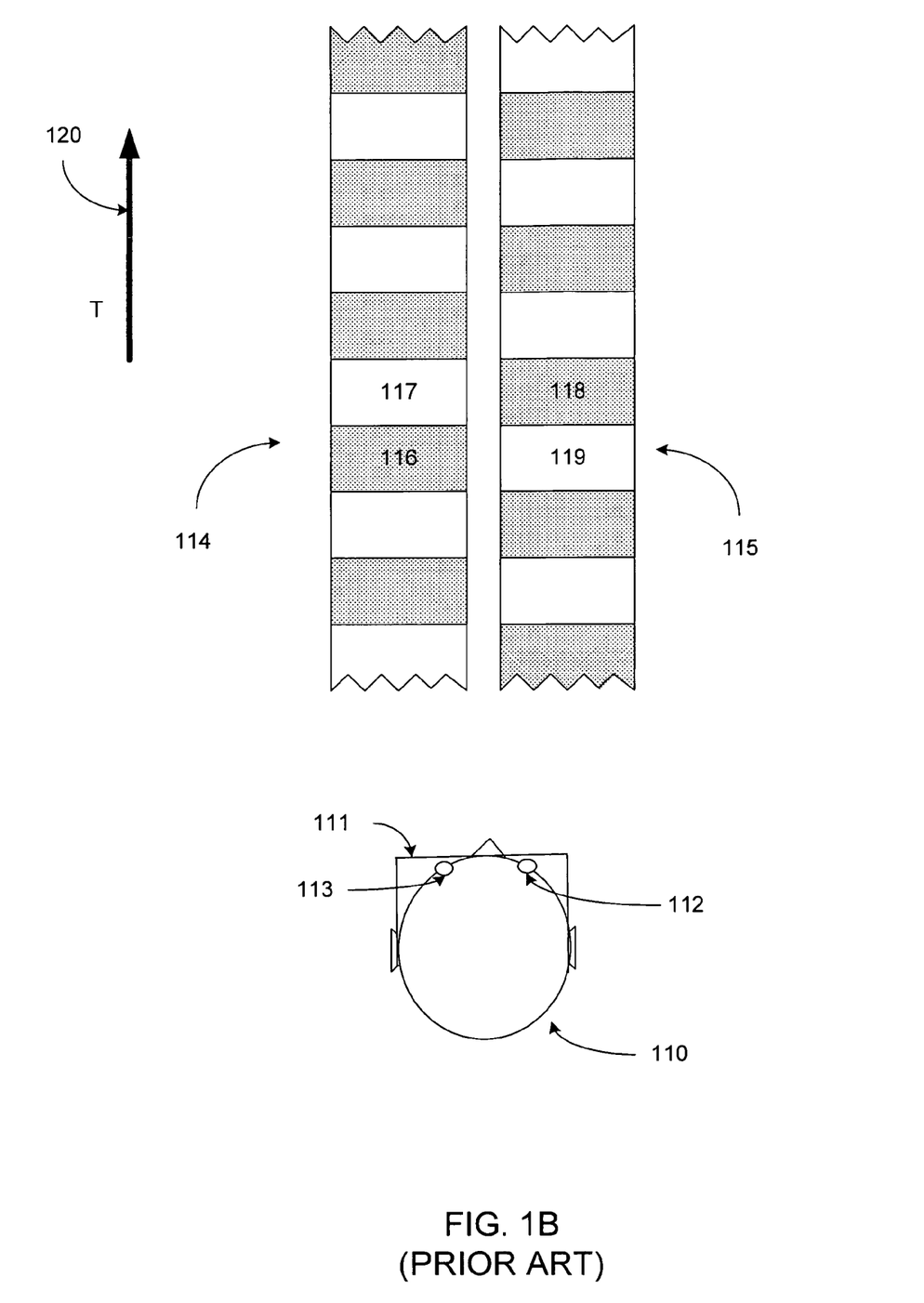
FIG. 1B is the field sequential projection scheme's train of left and right image frames or fields.

FIGS. 1A and 1B are diagrammatic representations of a previous field sequential stereoscopic projection system. The system illustrated in FIGS. 1A and 1B has had a successful commercial embodiment under the trade name ZScreen. Video server 101 has cable 102 connecting to projector 103. Video synchronization information is transmitted from the projector 103 by means of cable 104 to control box 105. Control box 105 energizes, using cable 106, the ZScreen modulator 107. The ZScreen modulator has been described in great detail in Lipton U.S. Pat. No. 4,792,850, which is hereby incorporated by reference. The ZScreen is an electro-optical modulator that switches between left- and right-handed circularly polarized light at video field rate. When used in front of the projection lens 110 the result is that, when observer 108 is wearing analyzing eyewear, only the left eye sees a train of left images and not right images, and vice versa. It is highly preferable to use a polarization-conserving screen 109, and such screens are generally well known.

FIG. 1B illustrates the separate trains of left and right images as projected field sequentially. The observer 110 wearing stereoscopic eyewear 111 observes images with left eye 113 and right eye 112. The fusion of the left- and right-eye images produces the stereoscopic image. A diagrammatic representation of the two trains of images is shown for the left train 114 and the right train 115. Field 116 is blank for the left image, as is 118 for the right image, and as depicted, these are out of phase. Typical left and right image fields, fields 117 and 119 respectively, are depicted out of phase. The time line given by T and the single-headed arrow 120 is shown to indicate the progression of fields.

Using the method of FIG. 1B, the left and right eyes of the observer see a train of left and right images emerging from a single projector. Half of the time each eye is seeing nothing, because it is seeing a succession or train of fields that are made up of image fields followed by a blank field so that, in effect, half of the fields projected by the single projector 103 are used for one eye and half are used for the other eye in sequence as depicted. This sequence is called, by those in computer graphics "page-flipping," also known as the "time-multiplexed" or field-sequential approach. The result, if the field rate is high enough and the images are prepared properly, is a high quality stereoscopic image.

The single projector approach is a more modern approach that has been used in the last 15 years or so and only lately in the commercial cinema. Originally this stereoscopic approach was introduced for industrial virtual reality or for corporate presentations, but has not, until lately, become a commercially viable product for the cinema.

Figure 2A:
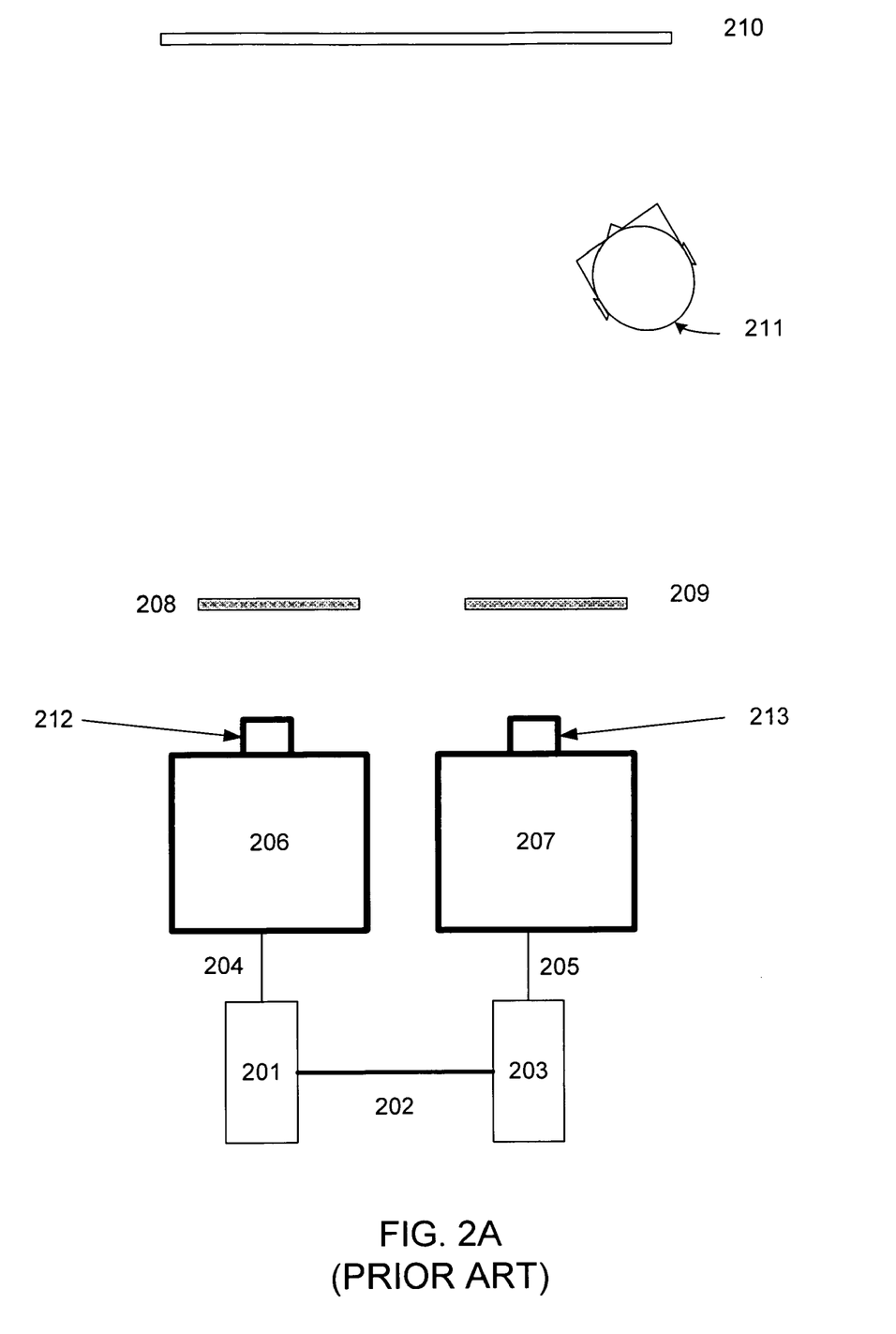
FIG. 2A illustrates the two-projector approach for stereoscopic imaging using sheet polarizers for image selection.
Figure 2B:
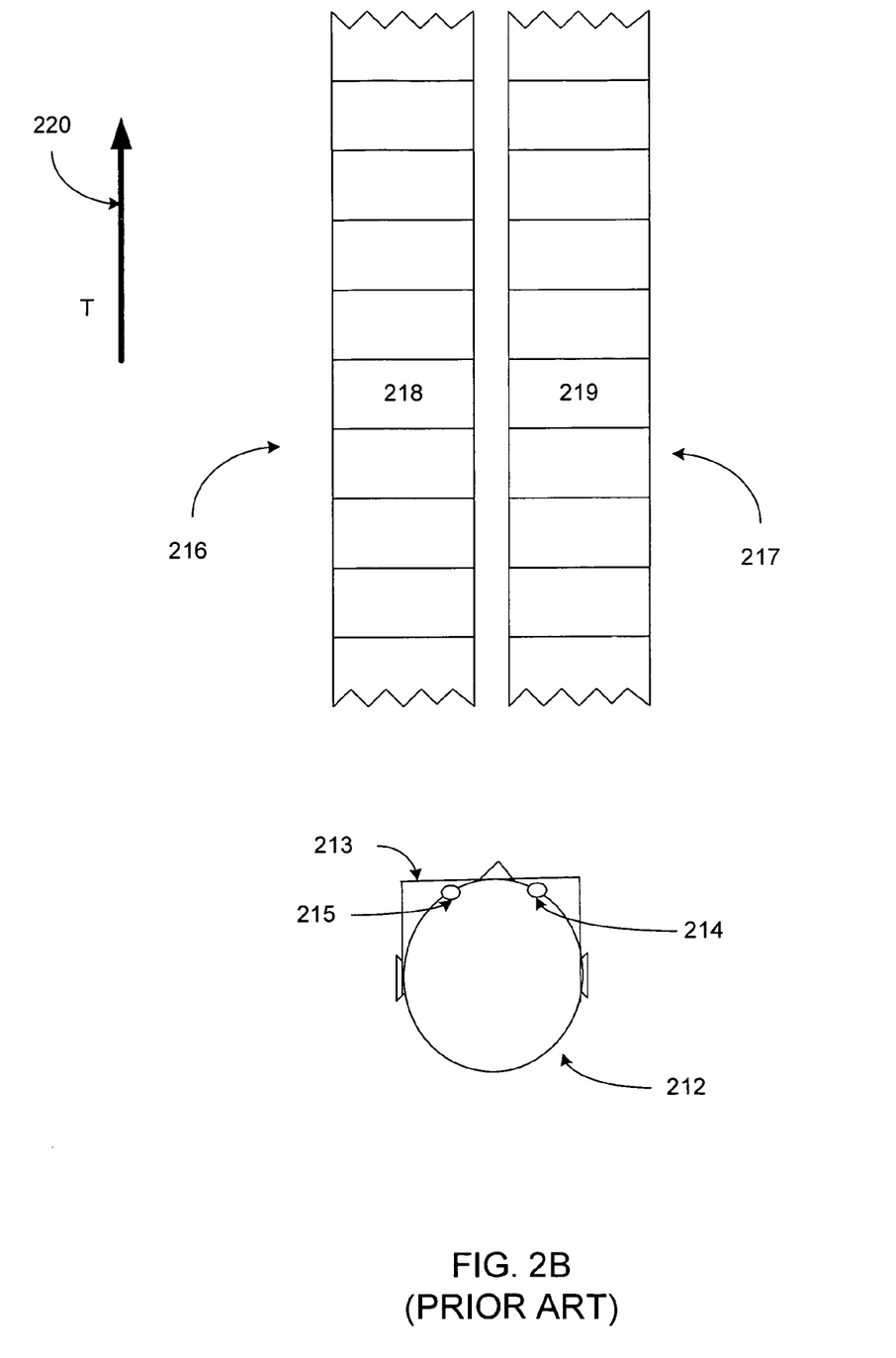
FIG. 2B is the prior art two-projector train of left and right images.

On the other hand, the original method shown in FIGS. 2A and 2B has been in existence since the 1930s and uses two projectors. This method is used in location-based entertainment, in theme parks, and was used in the theatrical cinema in the 1950s. The major advantage of using a double projector is brightness. Compared to the field sequential system of FIGS. 1A and 1B, which employs a single projector, two projector arrangements are twice as bright.

FIG. 2A show the previous dual projection setup comprising left and right projectors 206 and 207, with left and right servers 201 and 203 respectively. The servers 201 and 203 are synchronized by means of cable 202 so that the images transmitted from the left and right projectors 206 and 207 will be in synchrony and in phase. The left and right cables 204 and 205, respectively, feed projectors 206 and 207. In front of projector 206's lens 212 is a sheet polarizer 208, and in front of feed projector 207's lens 213 is sheet polarizer 209.

Note that a single server can output both left and right fields and this is also true for the field sequential approach described with the aid of FIGS. 1A and 1B. However the essence of these teachings, specifically in the context of FIGS. 2A and 2B has little or nothing to do with server configurations. Two servers may be configured, or a single server can provide source information for these projectors. Two servers are shown in this arrangement.

The images projected by 206 and 207 through sheet polarizers 208 and 209 are reflected off of screen 210 and viewed by observer 211. The screen, like that shown in FIG. 1A as screen 109, preferably conserves polarization. The polarization filters can be of the circular or linear varieties.

FIG. 2B diagrams what the user's eyes see. The assumption is that the projectors in FIG. 2A are electronic projectors, or digital projectors, using the DLP light engine devised by Texas Instruments now embodied in projectors by Barco, Christie, and NEC. However, the designs presented herein are not limited to use of the DLP light engine. Nevertheless, in order to adequately describe the instant design, aspects are presented based on employing the design using a DLP light engine-based projector.

The DLP light engine, unlike motion picture projection, is essentially continuously "on." Motion picture projection requires occlusion of the projection fields for two reasons. First, when the film is advanced in the projector, travel-ghosts result if the interrupting shutter does not occlude the light and what is at that instant a vertically traveling piece of film. Also, the effective field rate is doubled by using the Pross shutter to interrupt the projection frame once the motion picture frame is at rest, thereby increasing the flicker rate and thus satisfying the critical "fusion frequency" requirement, i.e. that a motion picture image must be displayed at a minimum number of times per second to eliminate the perception of flutter.

As is shown in FIG. 2B, the left and right eyes see images continuously. Observer 221 is wearing stereoscopic analyzing eyewear 213 and is observing the image through left eye 215 and right eye 214. Shown is a train of left images at 216 and right images at 217, and typical fields 218 and 219 (that is to say, left and right fields respectively) are shown. The arrow marked as T at 220 shows the time dimension. In this case, projectors 206 and 207 provide the train of images 216 for the left eye and the train of images 217 for the right eye; and if everything is coordinated properly and the photography is done properly, the observer will see good quality stereoscopic images.

It is important in the case of the dual projector setup that the left and right image presentation sequence be properly coordinated. All of the binocular symmetrical constraints described above apply. If the focal lengths of the left lens and the right lens do not match, then problems arise with the geometric constraint. If the images are misaligned in the vertical or the horizontal, additional geometric problems occur. If the arc lamps of the two projectors are not adjusted to have more or less the same illumination intensity, the image can be difficult to look at in the sense that the observer will experience fatigue.

There is also concern with the images being in synchrony. Although one would assume that it would be easier to make an electronic digital projector ensemble run in synchrony compared with a mechanical motion picture projector, this is not always the case. Even professional installations sometimes have the left and right projectors out of phase or out of synch.

On the other hand, looking at FIGS. 1A and 1B, because the left and right images are coming out of a single projector there is no opportunity for illumination and geometric asymmetries. These binocular symmetries are guaranteed. Both images are treated identically. The only symmetrical concern with the single projection ZScreen approach has to do with the temporal asymmetry. The images in FIGS. 1A and 1B cannot possibly be projected simultaneously since they are coming out of a single projector with the field sequential approach. This symmetrical concern can be overcome if the repetition rate is high enough—for example, at 144 frames per second for material that was shot at 24 frames per second, the industry standard as has been explained above.

Projection System Design

The present design addresses the illumination and temporal binocular symmetrical constraints in order to provide a brighter, better looking stereoscopic image that requires, after initial setup, little or no calibration. A projected stereoscopic image should do no harm and cause no viewer discomfort. Many previously available projection solutions caused viewer fatigue and discomfort. A novel and improved design, overcoming the pitfalls of the past, is preferably simple to use. In the case of a theatrical motion picture projector, if the projector does not run essentially unassisted, then the projector is not a practical product. Previous systems had employed projectors that required constant monitoring and repeated tweaking.

Figure 3A:
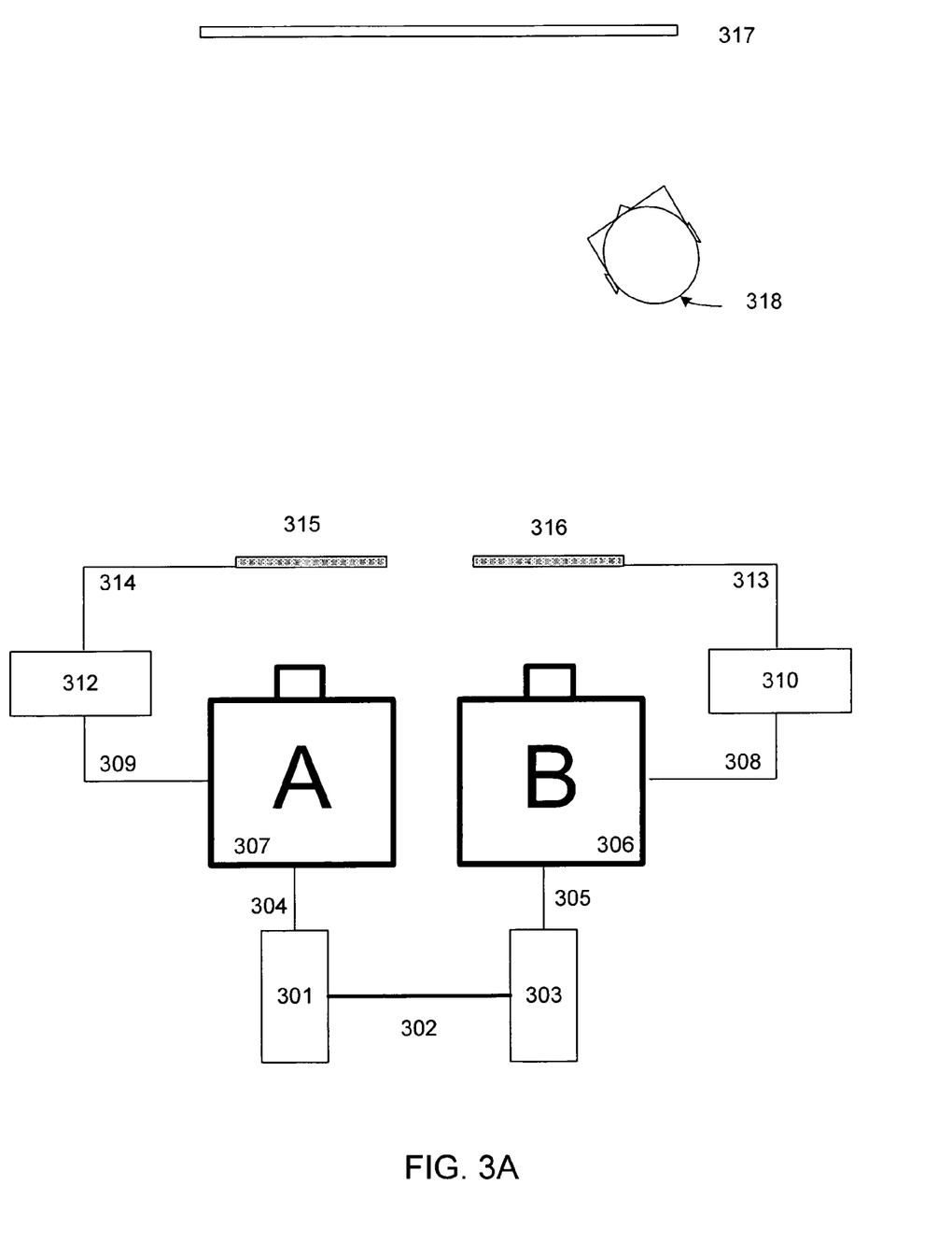
FIG. 3A represents the present dual projection push-pull modulator or ZScreen design.

FIG. 3A shows servers 301 and 303, used for the left and right images, respectively. As noted, a single server can be used to perform the functions of servers 301 and 303, or in other words a single server can provide images split between the left and right projectors. A single server may have two drives or the images can be formatted so that they can be encoded on a single drive. The servers 301 and 303, in the specific embodiment of FIG. 3A, are synchronized using cable 302, where synchronization comprises sending and receiving timing signals such that both projectors are projecting the required image at the appropriate time intervals. Cable 304 sends the video signal from server 301 to projector A, shown as projector 307. Similarly, cable 305 sends the image from server 303 to projector B, shown as projector 306. Projector A sends a synchronization signal to control box 312 via cable 309. Projector B sends a synchronization signal to control box 310 via cable 308. Cable 314 sends power to push-pull modulator or ZScreen 315, and cable 313 sends power to push-pull or ZScreen modulator 316. The ZScreen modulator has been commercially available for about 20 years.

Observer 318 views the image through polarized analyzing spectacles, as the image is reflected from polarization-conserving screen 317. Each projector receives both left and right image signals. Accordingly the signal fed to projector A via cable 305 has both left and right picture information and the signal fed to projector B has both left and right picture information.

Three general embodiments of the design are presented. The third embodiment can be used in conjunction with the first two to enhance image resolution.

In the first embodiment, the two projectors are run in synchrony. The ZScreen modulators 315 and 316 for the left and right modulators respectively are used to change the characteristic of polarized light at video field rate. Projector A projects a stream of left and right images, and projector B projects a different stream of left and right images. Unlike previous designs such as is shown in FIG. 2A in which the left projector is devoted to left images and the right projector is devoted to right images, in this embodiment the projector on the left side (projector A) projects both left and right images, and similarly the projector on the right side (projector B) also projects both left and right images. The projectors in this mode of operation, while in synchrony, have the projected fields phase adjusted so that unlike that which is represented in FIG. 1B, in which the eyes see images alternating with equal intervals of no image, in this case the eyes see image continuously. The images in this embodiment are in field-for-field synchronization, and such synchronization can be provided electronically, again by using timing signals between the devices to ensure the desired fields are being displayed at the desired times.

In general, a timing signal is sent between the two projectors and the same field is projected by each projector, each field being out of phase with the other. The degree of phase difference is variable between the two projectors, and depending on circumstances, different phase differences can produce better quality images.

Figure 3B:
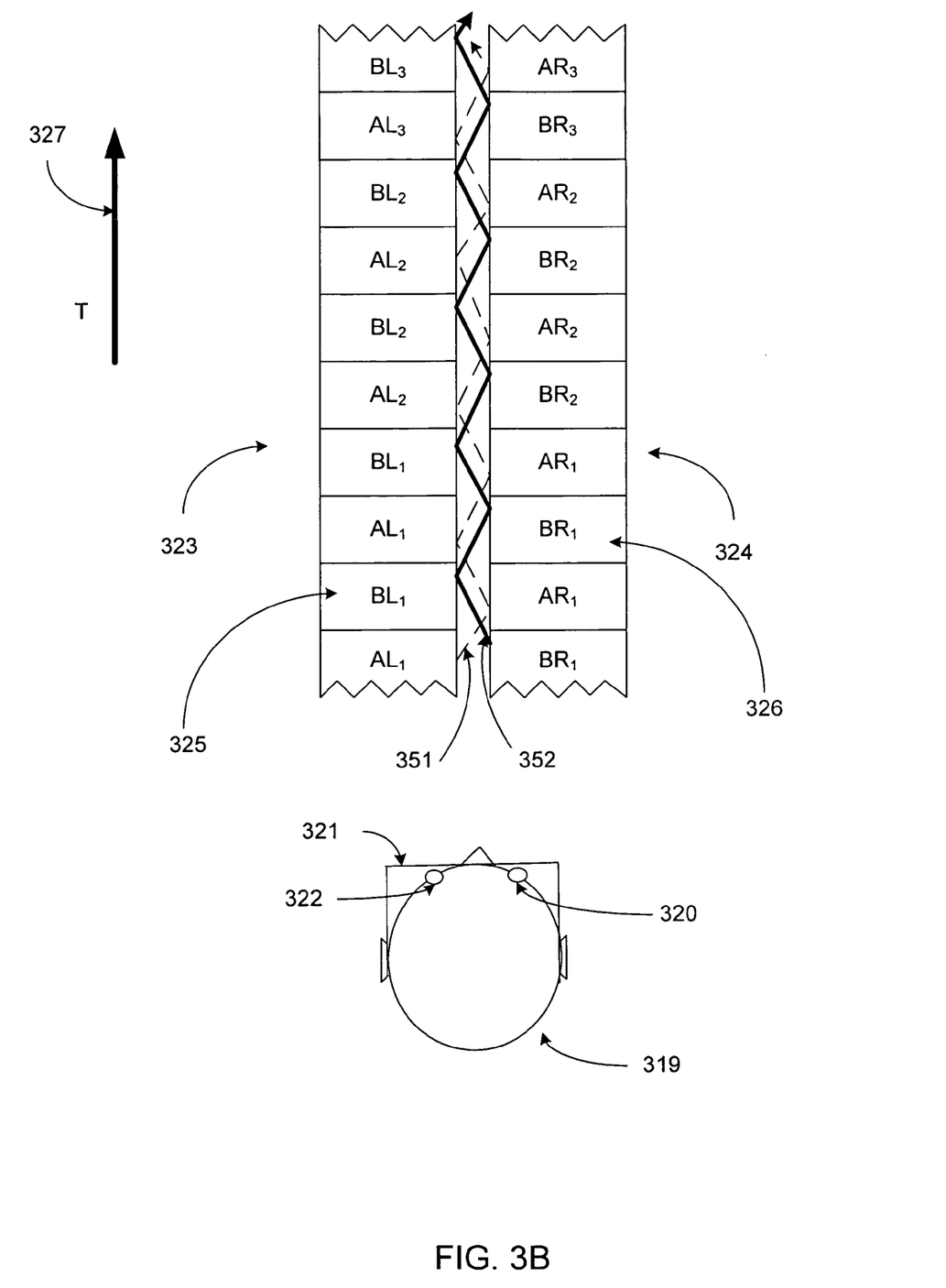
FIG. 3B shows the first field sequential projection scheme of trains of left and right images.

FIG. 3B is used to explain this first embodiment. In FIG. 3B, observer 319 is using circularly polarizing analyzing eyewear 320 in this case, to correspond with the output of the push-pull modulator or ZScreen. The left eye 322 sees only left images and the right eye 321 sees only the right images. The diagrammatic representation shows two trains of images, the left train 323 and the right train 324. Also shown is a typical frame 325 for the left image, and frame 326 for the right image. The vertical-going arrow marked with T at 327 is used to indicate the direction of time flow.

Each projector shares the burden of producing both the left and right fields. In the sequence described and illustrated—A standing for the A projector of FIG. 3B and B standing for the B projector (A and B have been chosen so as not to confuse the left and right projectors in terms of their actual physical location with the left and right fields)—L stands for the left perspective view, and R stands for the right perspective view. The subscripts identify the field number. Looking at the field trains 323 and 324, the train is $AL_1$, $BL_1$, $AL_1$, $BL_1$, $AL_2$ . . . and so on, for the left eye. For the right eye at 324 the train is $BR_1$, $AR_1$, $BR_1$, $AR_1$, $BR_2$ . . . and so on. Thus projection occurs using two projectors, and progresses in a first eye from first (A) projector, left field 1, second (B) projector, left field 1, first (A) projector, left field 1, second (B) projector, left field 1, first (A) projector, left field 2, second (B) projector, left field 2, and so forth. In the right eye, fields progress from second (B) projector, right field 1, first (A) projector, right field 1, second (B) projector, right field 1, first (A) projector, right field 1, second (B) projector, right field 2, and so forth. While the left eye is seeing $AL_1$, the right eye is at the same time seeing $BR_1$, and so on.

Note that in FIG. 3B, the representation of the two field trains is a sequential order of what the observer's eyes see. With respect to what is transmitted by the A or B projector, reference is made to lines 351 and 352. The A projector projects in accordance with the progression represented by line 351, while the B projector projects in accordance with the sequence shown by line 352. Lines 351 and 352 therefore each represent a field train transmitted by a projector, 351 representing the field train for the A projector and 352 the field train for the B projector. The field trains 323 and 324 represent field trains perceived by the observer's left and right eye, respectively.

In operation, for the design of FIG. 3B, projector A first transmits $AL_1$ while projector B at the same time (or substantially the same time) transmits $BR_1$. The next frame, projector A transmits $AR_1$, and projector B transmits $BL_1$. No blank images or fields are transmitted, and the net effect is an increase in the overall brightness perceived and temporal and illumination asymmetries are eliminated or substantially reduced. The user's left eye perceives $AL_1$, then $BL_1$, then $AL_1$, then $BL_1$, then $AL_2$, and so forth, while his right eye observes $AR_1$, $BR_1$, $AR_1$, $BR_1$, $AR_2$, etc.

The A projector is therefore used for both left and right images and the B projector is used in the same manner. Therefore, the left eye sees a train of images that have originated from both the A and the B projectors, and the right eye sees a train of images that have originated from the A and B projectors. The projectors are adjusted in this arrangement to be out of phase. By running the projectors and the ZScreens out of phase, the image appears to be "on" continuously.

Illumination and temporal symmetries can benefit from the design illustrated in FIG. 3B. The left and right images are essentially mixed or combined (in sequence by means of the persistence of vision) so that each eye sees a rapid succession of left images which originate from both A and B projectors, and right images which originate from both A and B projectors. Accordingly, the two illumination sources in terms of all illumination asymmetries—intensity or brightness of the image, vignetting, and also color balance—are mixed. Since both projectors contribute each image or field, even if the two projectors are not in good symmetry in terms of illumination, because the signals are mixed, the end result is that both left and right images are balanced. Assuming that the projectors are properly set up, even if they do drift apart over time, despite the fact that this is a dual projector setup, the ensemble behaves like a single field sequential projector in which left and right fields are treated identically.

The left and right trains of images are viewed continuously, so there is no blank period and the eyes are seeing images continuously. This can eliminate temporal asymmetry. The projectors may be run in the so-called "double-flash" mode in which each field or frame is concatenated and repeated twice, and the repetition rate is 96 frames per second, or they may be run in the so-called "triple-flash" mode in which each frame is concatenated and repeated three times for a total repetition rate of 144 frames per second. Single flash may be employed in certain circumstances. This arrangement can provide an extreme increase in brightness using the design of FIGS. 1A and 1B.

The second embodiment runs both projectors in phase rather than the out of phase operation of the first embodiment. Running both projectors in phase provides field trains identical to those described with respect to FIG. 1B, but cures illumination asymmetry because the images have a simultaneously blended illumination. This result is due to the left train of images 114 and the right train of images 115, with respect to FIG. 1B, mixing. Since the images are in phase the alternating of images characteristic of single projector field sequential projection results, despite the fact that two projectors are employed. Temporal asymmetry cannot be cured because the projectors are in phase. Accordingly, for example, frame 117 of FIG. 1B is made up of both the A and B left images and frame 119 is made up both the A and B right images, so that the result is that these images are mixed and illumination symmetry is guaranteed.

The net effect of this second embodiment is an increase in the overall brightness perceived and illumination asymmetries are eliminated or substantially reduced.

In the first embodiment the images are mixed by means of the psychophysical phenomenon of the persistence of vision. In the second embodiment the image fields are simply mixed additively simultaneously, but the end result is perceptually the same, namely consistently uniform left and right trains of image fields.

Hence from FIG. 1B, the progression of frames is, for the left eye, blank, left eye image 1, blank, left eye image 2, blank, left eye image 3, and so forth. For the left eye, progression is right eye image 1, blank, right eye image 2, blank, right eye image 3, blank, and so forth. In the second embodiment, progression for left eye is blank, left 1 plus right 1, blank, left 2 plus right 2, blank, left 3 plus right 3, blank, and so forth. Progression for right eye is left 1 plus right 1, blank, left 2 plus right 2, blank, left 3 plus right 3, blank, and so forth.

The third embodiment may be applied to both the first and second embodiments and is based on the television concept of interlace. In the case of television, interlace is a bandwidth reducing technique to improve resolution. This third embodiment is a variation on that concept but because the design differs in two significant respects it is termed "quasi-interlace."

TV interlace uses successive lines of a scanned image, alternating every other line, to build the image. If the images are repeated at a sufficient rate, no flicker results. For television, interlace captures one field, or one half image, at a time. In quasi-interlace, the system captures the entire image at once and then deconstructs the image to meet the format requirements of digital projection.

TV interlace alternates lines such that horizontal lines do not overlap. In the case of quasi-interlacing, the lines overlap to the extent that half of each line is covered alternately by its simultaneously written or successively written line.

Another way that quasi-interlace departs from television interlace is that when applied to the second embodiment, quasi-interlace comprises a simultaneous display of both interlace elopements. In the case of quasi-interlace, as applied to the first embodiment described above, the result more nearly resembles the traditional interlace technique.

Figure 4A:
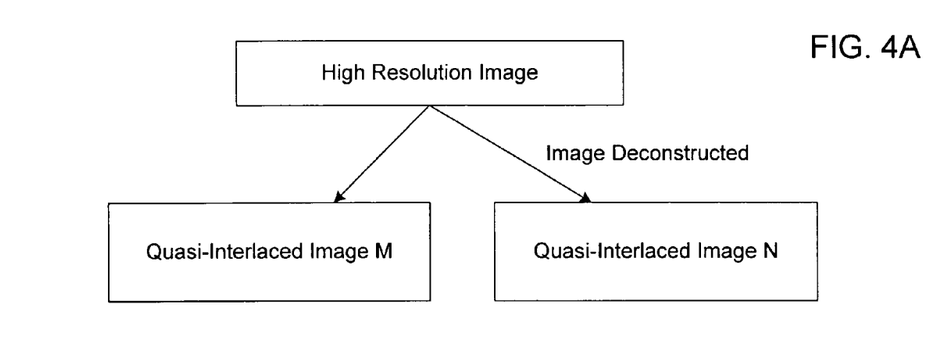
FIG. 4A is a chart illustrating quasi-interlace deconstruction.
Figure 4B:
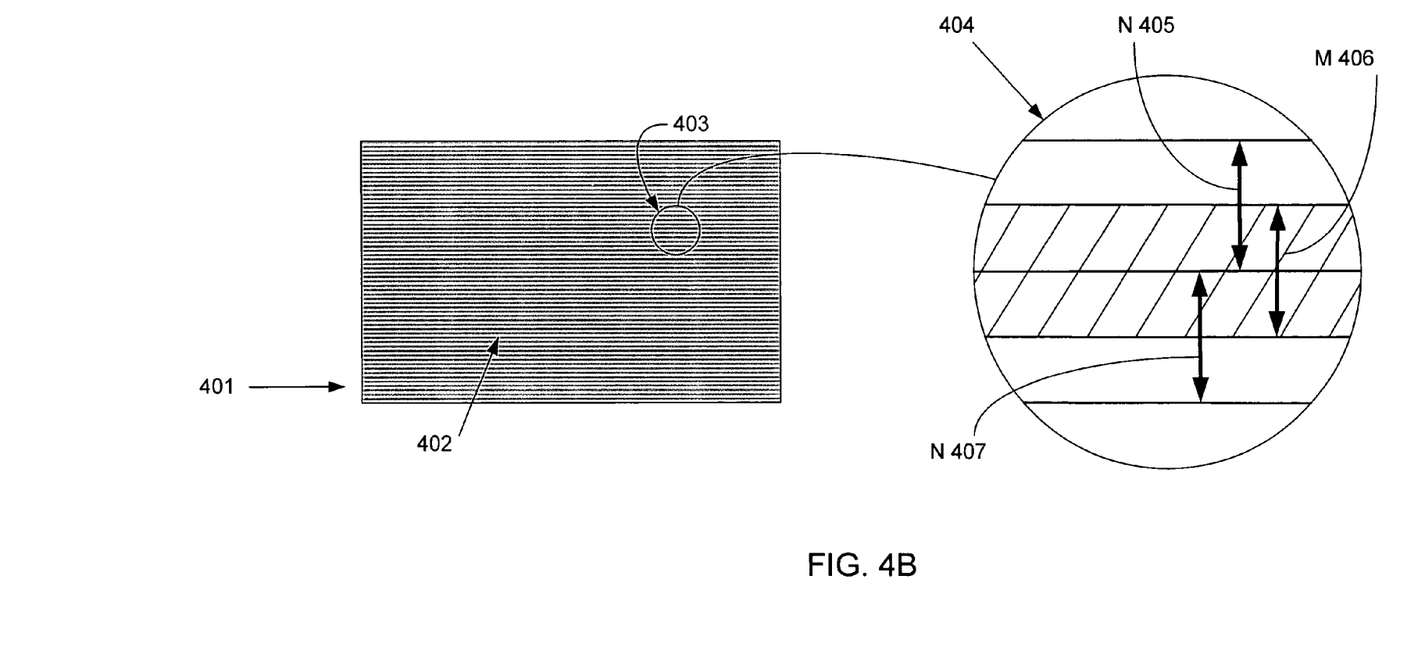
FIG. 4B illustrates the quasi-interlace image structure.
Figure 4C:
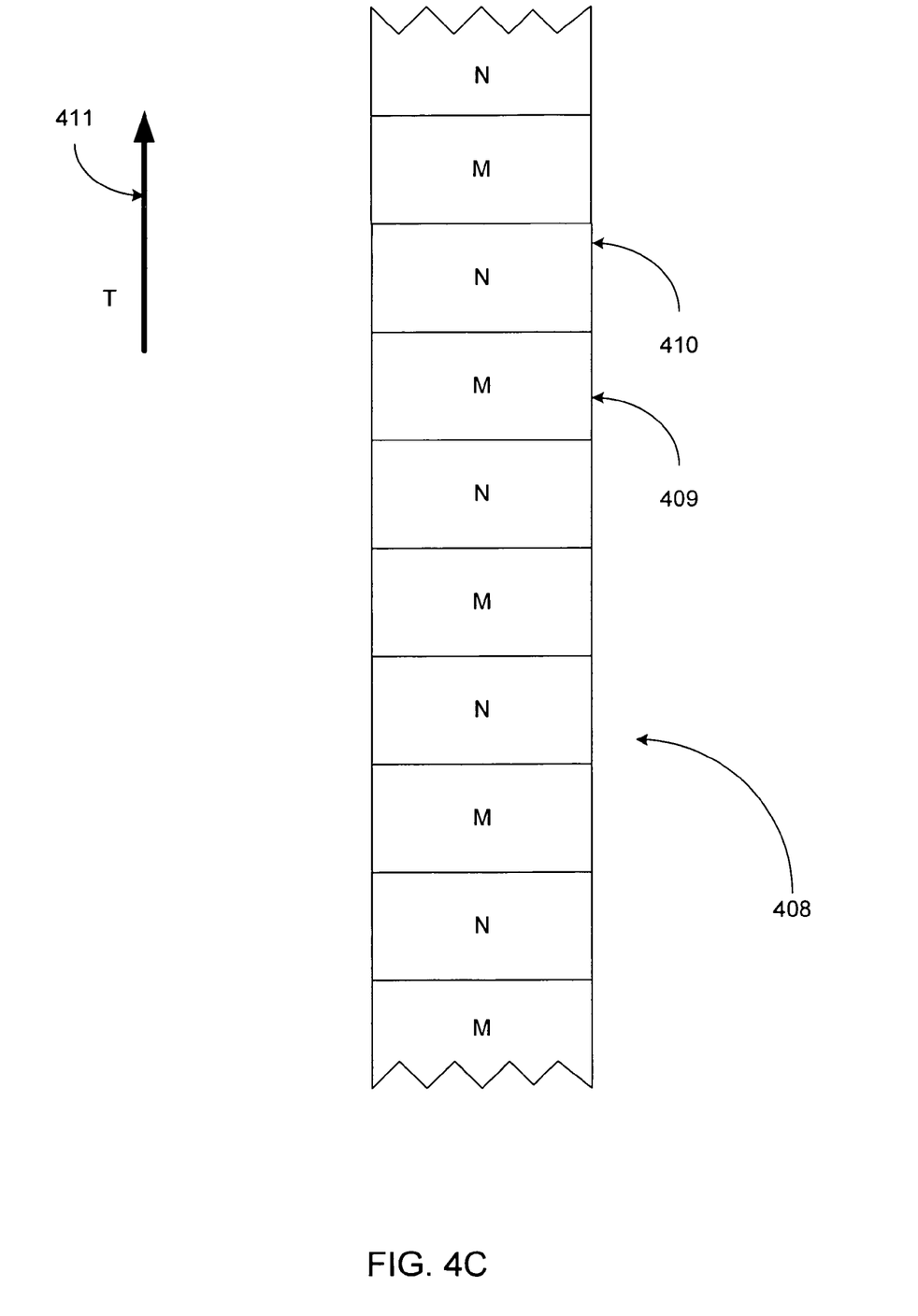
FIG. 4C is a diagrammatic representation of a train of fields incorporating the quasi-interlace technique.

Quasi-interlace is described with the help of FIGS. 4A through 4C. An image that is twice the resolution of the projector's capability is used as a starting point. That is to say, the image frame has twice the number of pixels as that which the projector is capable of handling. As showing in diagram 4A, the High Resolution Image is deconstructed and turned into two quasi-interlaced image fields, M and N. M contains half the number of pixels as the original image as does N. Half of the rows, or horizontal lines of pixels, are shifted to M and half to N. Unlike the TV interlace scheme, no space or empty image area exists between lines because the lines abut one another.

Projection involves transmitting a train of fields as depicted in FIG. 4C. FIG. 4B shows the final image quasi-interlaced as projected on the screen. The screen 401 includes image 402. Area 403 indicates an area to expand and evaluate, and the expanded area is shown in 404. Projectors A and B from FIG. 3A are adjusted to be displaced by one half a pixel in the vertical, horizontal, or diagonal direction so that the overlap pattern given in 404 is fulfilled. Center line M 406, shown as a hatched area, overlaps itself half on top of each of two successive N lines 405 and 407. In this manner, twice the resolution can be projected either sequentially, as in the case for the first embodiment, or simultaneously, as in the case for the second embodiment.

FIG. 4C illustrates the train of fields for one eye. It is not necessary to describe the field train for two eyes since such an explanation is redundant because each eye, in the case of quasi-interlace, is handled as a separate entity and is not the subject of a stereoscopic combination. Quasi-interlace is typically employed with multiple projectors, in stereoscopic modes, but may also be employed in planar modes using multiple projectors. FIG. 4C presents field train 408 made up of quasi-interlaced fields M 409 and N 410. The combination of successive quasi-interlaced images by the eye-brain depends on the persistence of vision to achieve the effect of combining two half resolution images into one full or high resolution image.

Quasi-interlace does not need to take the form of horizontal lines. The process can involve vertical lines, or diagonal offset, or an image that has been deconstructed along the lines of, for example, a checkerboard, or other arrangements.

All of the embodiments provided above include what may be considered a safety mode. If one of the two projectors fails, the safety mode ensures that the display continues, as sufficient stereoscopic images will be transmitted to the screen to enable a user to view the movie and perceive the stereoscopic effect. The same cannot be said of the prior system, such as the system of FIGS. 1A and 1B, where a projector failure disrupts a critical component of the stereoscopic images and the stereoscopic effect cannot be perceived. In the present embodiments, the image is still projected with full stereoscopic depth but certain attributes will be lacking in the event of such a failure. For example, brightness will suffer or resolution will be reduced. However, such a failure is not catastrophic because the arrangement provides for continued operation even in the event that one of the two projectors fails to operate.

What has been described here is a means for a dual projector ensemble using a modulator, such as a push-pull or ZScreen modulator to project stereoscopic images. These images are coordinated in a manner so that the illumination and temporal symmetry constraints are matched. The result is a very bright, easy-to-view stereoscopic motion picture image. In addition, certain quasi-interlace functions are described which may be optionally employed to enhance resolution.

The design presented herein and the specific aspects illustrated are meant not to be limiting, but may include alternate components while still incorporating the teachings and benefits of the invention, namely the dual path stereoscopic projection system disclosed and claimed herein. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for projecting stereoscopic images using a multiple projector arrangement comprising a first projector and a second projector, the method comprising:

transmitting a first field train from the first projector, the first field train comprising first projector left and right images; and concurrently transmitting a second field train from the second projector, the second field train comprising second projector right and left images, wherein the first projector left image is transmitted by the first projector at substantially a same time as the second projector right image is transmitted by the second projector.

2. The method of claim 1, wherein the first field train and second field train are free of blank images.

3. The method of claim 1, further wherein the second projector left image is transmitted by the second projector at a later time and substantially a same instance as the first projector right image is transmitted by the first projector.

4. The method of claim 1, further comprising dividing images into first projector left images, first projector right images, second projector left images, and second projector right images, said dividing occurring before said transmitting.

5. The method of claim 1, wherein an observer's left eye perceives one first projector left image transmitted from the first projector followed by a second projector left image transmitted from the second projector.

6. The method of claim 1, further comprising quasi-interlacing the images, wherein quasi-interlacing comprises deconstructing each image by dividing pixels in each image into two sub-images, each sub-image comprising a complementary series of regions comprising fewer pixels than in each image.

7. The method of claim 6, wherein quasi-interlacing comprises transmitting a first sub-image followed by transmitting a complementary second sub-image.

8. A method for projecting stereoscopic images using a multiple projector arrangement comprising a first projector and a second projector, the method comprising:
   transmitting a first field train from the first projector, the first field train comprising first projector left images alternating with first projector right images;
   concurrently transmitting a second field train from the second projector, the second field train comprising second projector left images alternating with second projector right images; and
   quasi-interlacing the images;
   wherein said first projector transmits one first projector left image at a first time substantially identical to the second projector transmitting one second projector left image.

9. The method of claim 8, wherein said first projector transmits one first projector right image at a second time substantially identical to the second projector transmitting one second projector right image.

10. The method of claim 8, wherein when the first projector left image is transmitted from the first projector and the second projector right image is transmitted from the right projector, an observer's right eye does not perceive a significant part of the image.

11. The method of claim 8, wherein the quasi-interlacing comprises deconstructing each image by dividing pixels in each combined image into two sub-images, each sub-image comprising a complementary series of regions comprising fewer pixels than in each image.

12. The method of claim 11, wherein the quasi-interlacing further comprises transmitting a first sub-image followed by transmitting a complementary second sub-image.

13. The method of claim 8, wherein the quasi-interlacing comprises deconstructing the left image and deconstructing the right image by dividing pixels in each of the left and right images into sub-images, each sub-image comprising a complementary series of regions comprising fewer pixels than in each right image and each left image.

14. The method of claim 13, wherein the quasi-interlacing further comprises transmitting a first sub-image followed by transmitting a complementary second sub-image.

15. A projection apparatus configured to projecting stereoscopic images, comprising:
   a first projector configured to transmit a first field train, the first field train comprising first projector left and right images; and
   a second projector configured to concurrently transmit a second field train, the second field train comprising second projector right and left images,
   wherein the first projector left image is transmitted by the first projector at substantially a same time as the second projector right image is transmitted by the second projector.

16. The projection apparatus of claim 15, further comprising a connective element between the first projector and the second projector, the connective element configured to enable transmission of synchronization signals between the first projector and the second projector.

17. The projection apparatus of claim 15, wherein the first field train and second field train are free of blank images.

18. The projection apparatus of claim 15, wherein each first projector left image and each first projector right image occurs at least once in alternating succession in the first field train.

19. The projection apparatus of claim 15, further comprising a server arrangement configured to divide images into first projector left images, first projector right images, second projector left images, and second projector right images, and transmit said first projector left images and first projector right images to the first projector, and the second projector left images and second projector right images to the second projector.

20. The projection apparatus of claim 15, wherein an observer's left eye perceives one first projector left image transmitted from the first projector followed by a second projector left image transmitted from the second projector.

21. The projection apparatus of claim 19, wherein the server arrangement is further configured to quasi-interlace the images, wherein quasi-interlacing comprises deconstructing each image by dividing pixels in each image into two sub-images, each sub-image comprising a complementary series of regions comprising fewer pixels than in each image.

* * * * *